US012115774B2

(12) United States Patent
Mizutani et al.

(10) Patent No.: US 12,115,774 B2
(45) Date of Patent: Oct. 15, 2024

(54) DRYING DEVICE, PRINTING APPARATUS, AND PRINTING METHOD

(71) Applicants: Yuuki Mizutani, Kanagawa (JP); Motoaki Saitoh, Tokyo (JP)

(72) Inventors: Yuuki Mizutani, Kanagawa (JP); Motoaki Saitoh, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 233 days.

(21) Appl. No.: 17/904,304

(22) PCT Filed: Apr. 20, 2021

(86) PCT No.: PCT/IB2021/053226
§ 371 (c)(1),
(2) Date: Aug. 16, 2022

(87) PCT Pub. No.: WO2021/240259
PCT Pub. Date: Dec. 2, 2021

(65) Prior Publication Data

US 2023/0098759 A1 Mar. 30, 2023

(30) Foreign Application Priority Data

May 26, 2020 (JP) ................................ 2020-091268

(51) Int. Cl.
*B41J 11/00* (2006.01)
*B41J 3/413* (2006.01)

(52) U.S. Cl.
CPC .......... *B41J 11/0024* (2021.01); *B41J 3/413* (2013.01); *B41J 11/007* (2013.01)

(58) Field of Classification Search
CPC .... B41J 11/0024; B41J 11/002; B41J 13/076; B41J 2/01; B41J 11/0015; B41J 11/007; B41J 3/413; B41J 11/00242; B41J 11/00244; C25D 11/08; C25D 11/10
See application file for complete search history.

(56) References Cited

U.S. PATENT DOCUMENTS

| | | | |
|---|---|---|---|
| 4,887,964 | A | 12/1989 | Takeuchi et al. |
| 2006/0056886 | A1 | 3/2006 | Ohishi et al. |
| 2012/0155919 | A1 | 6/2012 | Cardoso et al. |

(Continued)

FOREIGN PATENT DOCUMENTS

| | | |
|---|---|---|
| JP | S64-15782 | 1/1989 |
| JP | 8-123232 | 5/1996 |

(Continued)

OTHER PUBLICATIONS

Japanese Office Action dated Dec. 26, 2023, in Japanese application No. 2020-091268, 2 pages.

(Continued)

*Primary Examiner* — Jannelle M Lebron
(74) *Attorney, Agent, or Firm* — Grüneberg and Myers PLLC

(57) ABSTRACT

A drying device includes a conveyer configured to convey a contacted member by contact with the contacted member, and a heater configured to heat the contacted member. The conveyer includes a surface layer that comes into contact with the contacted member. The surface layer includes a support layer having a surface having multiple recessed portions, and a fluororesin adhering to the recessed portions. The support layer contains alunite sulfate.

17 Claims, 1 Drawing Sheet

(56) References Cited

U.S. PATENT DOCUMENTS

| | | | |
|---|---|---|---|
| 2015/0251452 | A1 | 9/2015 | Hatanaka et al. |
| 2017/0107385 | A1 | 4/2017 | Kumai et al. |
| 2017/0137640 | A1 | 5/2017 | Mizutani et al. |
| 2017/0137641 | A1 | 5/2017 | Saito et al. |
| 2017/0260405 | A1 | 9/2017 | Mio et al. |

FOREIGN PATENT DOCUMENTS

| | | |
|---|---|---|
| JP | 2008-134353 | 6/2008 |
| JP | 2009-275175 | 11/2009 |
| JP | 2011-252053 | 12/2011 |
| JP | 2012-128416 | 7/2012 |
| JP | 2014-156317 | 8/2014 |
| JP | 2016-095475 | 5/2016 |
| JP | 2019-168676 | 10/2019 |
| WO | WO 2019/181850 A1 | 9/2019 |

OTHER PUBLICATIONS

International Search Report issued on Jul. 12, 2021 in PCT/IB2021/053226 filed on Apr. 20, 2021.

Shigenori Kuga, et al., "Development and application of dynamic scanning absorptometer", Japan Tappi Journal, May 1994 (vol. 48,5) p. 88-92.

DRYING DEVICE, PRINTING APPARATUS, AND PRINTING METHOD

CROSS-REFERENCE TO RELATED APPLICATIONS

This application is the National Stage entry under § 371 of International Application No. PCT/IB2021/053226, filed on Apr. 20, 2021, and which claims the benefit of priority to Japanese Application No. 2020-091268, filed on May 26, 2020. The content of each of these applications is hereby incorporated by reference in its entirety.

BACKGROUND OF THE INVENTION

Technical Field

The present disclosure relates to a drying device, a printing apparatus, and a printing method.

BACKGROUND ART

In a printing apparatus such as an inkjet device, a conveyer for conveying a recording medium (e.g., continuous paper, cut paper) is provided. The conveyer conveys the recording medium to a liquid composition applicator that applies a liquid composition (e.g., ink) thereto and to a liquid composition heater that heats the applied liquid composition to dry.

However, among such conveyers, those which come into direct contact with a region to which the liquid composition has been applied may cause an undesired phenomenon in which the liquid composition is transferred to the conveyer.

Patent Literature 1 discloses a roller for conveying a printing material in a device having a printing function, which includes a rod-shaped core and a wire containing a fluororesin fiber that is spirally wound around an outer circumferential surface of the core. It is disclosed therein that the roller is a highly-releasable roller that can smoothly feed the printing material and can maintain the print image quality high.

CITATION LIST

Patent Literature

[PTL 1]
Japanese Unexamined Patent Application Publication No. 2014-156317 [PTL 2]

SUMMARY OF INVENTION

Technical Problem

In a case in which a heater is provided in the vicinity of a conveyer having a fluororesin on its surface and the surface temperature of the conveyer is thereby increased, the runout tolerance of the conveyer during conveyance of a contacted member increases with time. When such a conveyer with a large runout tolerance is used for a drying device, a problem may arise that a vibration is caused in the drying device during conveyance of the contacted member.

Solution to Problem

In accordance with embodiments of the present invention, a drying device is provided. The drying device includes a conveyer configured to convey a contacted member by contact with the contacted member, and a heater configured to heat the contacted member. The conveyer includes a surface layer that comes into contact with the contacted member. The surface layer includes a support layer having a surface having multiple recessed portions, and a fluororesin adhering to the recessed portions. The support layer contains alumite sulfate.

Advantageous Effects of Invention

The drying device according to embodiments of the present invention exerts an excellent effect of suppressing a vibration caused in the drying device during conveyance of a contacted member.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF EMBODIMENTS

Figure 1:
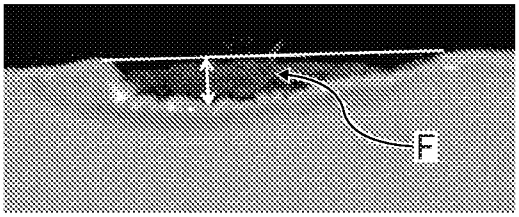
FIG. 1 is a photograph of a cross-section of the support layer having a recessed portion.

The terminology used herein is for the purpose of describing particular embodiments only and is not intended to be limiting of the present invention. As used herein, the singular forms "a," "an," and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, one embodiment of the present invention is described.

The drying device of the present embodiment includes a conveyer and a heater, and optionally other members as needed.

First, the conveyer and the heater of the drying device are described below, and then the drying device and a printing method performed using the drying device are described thereafter.

Conveyer

The conveyer is a member configured to convey a contacted member by contact with the contacted member. The conveyer includes a surface layer that comes into contact with the contacted member. Preferably, the conveyer includes a substrate on which the surface layer that comes into contact with the contacted member is provided. The conveyer may further include other members, as needed.

Surface Layer

The surface layer is a layer that comes into contact with the contacted member. The surface layer includes: a support layer having a surface having multiple recessed portions and non-recessed portions that are regions excluding the recessed portions; and a fluororesin adhering at least to the recessed portions. The surface layer may further include other members, as needed.

Support Layer

The support layer is a layer containing alumite sulfate (in other words, "alumite sulfate film"), and may further contain other materials as needed. Here, a layer containing alumite sulfate refers to a layer containing a material derived by an alumite sulfate treatment. The alumite sulfate treatment refers to a treatment for anodizing aluminum in a sulfuric acid aqueous solution. Thus, the layer containing a material derived by the alumite sulfate treatment is a layer containing aluminum oxide and from which a sulfur component is detectable. Here, the case where a sulfur component is detectable refers to a case where data indicating the presence of a sulfur component is obtainable by, for example, a sulfur component mapping performed on a cross-section of the support layer. Specifically, the sulfur component mapping may be performed by performing an EDS (Energy Dispersive X-ray Spectroscopy) elemental analysis (using Phenom ProX, product of Phenom-World Holding B.V) on a cross-section of the support layer.

Whether a layer is a layer containing alumite sulfate (in other words, a layer containing aluminum oxide and from which a sulfur component is detectable) may be confirmed by, for example, acquiring data indicating the presence of a sulfur component, an aluminum component, and an oxygen component in the same region by performing a sulfur component mapping, an aluminum component mapping, and an oxygen component mapping, respectively, on a cross-section of the support layer. Specifically, the sulfur component mapping, the aluminum component mapping, and the oxygen component mapping may be performed by performing an EDS (Energy Dispersive X-ray Spectroscopy) elemental analysis (using Phenom ProX, product of Phenom-World Holding B.V) on a cross-section of the support layer.

As described above, the support layer is a layer containing alumite sulfate, so that multiple recessed portions can be provided on a surface thereof. Preferably, the recessed portions are derived by the alumite sulfate treatment, and no other treatment for forming recessed portions is provided in the manufacturing process. The recessed portion is described in detail below with reference to FIG. 1. FIG. 1 is a photograph of a cross-section of the support layer having a recessed portion. As shown in FIG. 1, the recessed portion is a recessed structure formed on the surface of the support layer. Further, as shown in FIG. 1, a fluororesin F is adhering to the recessed portion.

Why the fluororesin is preferably adhering to the recessed portion is described below. Assuming the case of the present embodiment in which a conveyer configured to convey a contacted member by contact with the contacted member is disposed in the vicinity of a heater and the surface temperature of the conveyer is raised thereby. When the conveyer includes a fluororesin simply adhering to its surface, the runout tolerance of the conveyer during conveyance of the contacted member increases with time. This is because the fluororesin adhering to the surface of the conveyer softens as the surface temperature of the conveyer rises and gets scraped off toward the contacted member side upon contact of the conveyer with the contacted member, and the conveyer thereby undergoes dimensional deformation with time. In a drying device containing such a conveyer with a large runout tolerance, a large load is likely to be generated on the bearing portion of the conveyer. As a result, a problem may arise that a vibration is caused in the drying device during conveyance of the contacted member. This vibration may further induce other problems. For example, when this drying device is used in an inkjet printing apparatus, the ink landing position may deviate due to the vibration.

On the other hand, in the case of the conveyer of the present embodiment having recessed portions to which the fluororesin is adhering, the fluororesin is prevented from being scraped off toward the contacted member side with time, even when the conveyer has been in contact with the contacted member for a long period of time with the surface temperature high. As a result, the runout tolerance can be reduced for an extended period of time, and the vibration caused in the drying device can be suppressed.

The temperature of the surface layer of the conveyer is preferably 50° C. or higher, more preferably 60° C. or higher, and most preferably 70° C. or higher. As the temperature of the surface layer increases, the coefficient of friction of the fluororesin increases, and the vibration becomes large in a drying device using a conventional conveyer. By contrast, in the drying device of the present embodiment, the vibration becomes not so large even when the temperature of the surface layer increases, which makes the difference in effect more remarkable. The temperature of the surface layer of the conveyer is preferably 200° C. or lower, more preferably 150° C. or lower, and most preferably 100° C. or lower. This is because, in the case where the contacted member is a recording medium such as a paper sheet, the recording medium is prevented from discoloring or wrinkling when the temperature of the surface layer is 200° C. or lower. Preferably, the temperature of the surface layer of the conveyer is adjusted by a heater (to be described later) provided in the vicinity of the conveyer. The heater is a member independent from the conveyer as described later.

As long as the fluororesin is adhering to the recessed portions, it does not matter whether or not the fluororesin is adhering to the non-recessed portions. In other words, the fluororesin may or may not be adhered to the non-recessed portions. However, it is preferable that an area where the fluororesin is present in a unit area of the recessed portions be larger than an area where the fluororesin is present in a unit area of the non-recessed portions. Here, the area where the fluororesin is present represents an area where the fluororesin is present in an image of the surface layer in a plan view. The area where the fluororesin is present can be determined by, for example, as follows. First, a fluorine component mapping is performed on the surface layer of the conveyer. Specifically, the fluorine component mapping may be performed by performing an EDS (Energy Dispersive X-ray Spectroscopy) elemental analysis (using Phenom ProX, product of Phenom-World Holding B.V). Next, using a software program ProSuite, an area where the fluororesin is present in a unit area of the recessed portions and an area where the fluororesin is present in a unit area of the non-recessed portions are calculated from the acquired data. Similarly, at 5 randomly selected portions, an area where the fluororesin is present in a unit area of the recessed portions and an area where the fluororesin is present in a unit area of the non-recessed portions are calculated, and the average of the calculated values are employed. Here, a region where a fluorine component is present refers to a region where the fluorine atom concentration is 1% or more.

The depth of the recessed portions is preferably from 0.2 to 2.0 μm, more preferably from 0.4 to 1.9 μm, and most preferably from 1.1 to 1.6 μm. When the depth of the recessed portions is in the above range, the runout tolerance can be reduced for a more extended period of time, and as a result, the vibration caused in the drying device can be more suppressed. In the present disclosure, the depth of the recessed portion refers to the length of the perpendicular line, as indicated by arrow in FIG. 1, which is the longest among those drawn to the surface of the support layer from a straight line that connects edge points of the recessed portion.

Preferably, in a plan view of the recessed portions such as a photograph thereof, the recessed portions include multiple adhesion regions to which the fluororesin is adhering and multiple non-adhesion regions to which the fluororesin is not adhering (typically, regions in which the support layer is exposed), and at least one of the multiple non-adhesion region has an area of from 0.01 to 0.03 $\mu m^2$. More preferably, multiple non-adhesion regions have an area of from 0.01 to 0.03 $\mu m^2$. When the recessed portions include at least one non-adhesion region having an area of from 0.01 to 0.03 $\mu m^2$, an area where the contacted member and the fluororesin are in vacuum contact with each other can be reduced, and the runout tolerance can be reduced for a more extended period of time. As a result, the vibration caused in the drying device can be more suppressed.

The area of the non-adhesion region can be determined, for example, as follows. First, an aluminum component mapping is performed on the recessed portions. Specifically, the aluminum component mapping may be performed by performing an EDS (Energy Dispersive X-ray Spectroscopy) elemental analysis (using Phenom ProX, product of Phenom-World Holding B.V). Next, using a software program ProSuite, an area of each non-adhesion region is calculated from the acquired data. The measured area at the time of calculation is, for example, 10 μm×8 μm.

How to adjust the area of at least one of the non-adhesion regions to from 0.01 to 0.03 $\mu m^2$ is not particularly limited. One example method involves: immersing a member having the support layer thereon in a dispersion liquid containing fluororesin particles to make the fluororesin adhere to the support layer; and polishing the surface of the member with a flexible non-woven fabric having low water absorptivity. Preferably, the non-woven fabric does not leave fibers on the surface of the member. Specific examples thereof include, but are not limited to, a fluororesin fiber sheet. Here, the area of the non-adhesion region represents a relatively small area. This is because, since the fluororesin adhering to the recessed portions partially remains in the form of particles from the time of manufacture, gap regions are formed between the multiple fluororesin particles, and the area of the gap regions corresponds to the above-described area. Therefore, in the case of allowing fluororesin particles to adhere by spraying of a dispersion liquid containing the fluororesin particles instead of the immersing as described above, a non-adhesion region having the above-described area is not formed. It is considered that this is because dispersibility of the fluororesin particles is reduced during spraying as compared with the case of immersing. Also, when a post-treatment for forming a uniform layer of fluororesin is performed by integrating fluororesin particles adhering to the support layer, a non-adhesion region having the above-described area is not formed.

The thickness of the support layer is preferably from 25.0 to 35.0 μm. When the thickness of the support layer is from 25.0 to 35.0 μm, both rigidity of the conveyer and formation of the recessed portions can be achieved, and the runout tolerance can be reduced for a more extended period of time. As a result, the vibration caused in the drying device can be more suppressed. The thickness of the support layer can be determined, for example, as follows. First, a sulfur component mapping, an aluminum component mapping, and an oxygen component mapping are performed on a cross-section of the conveyer. Specifically, the sulfur component mapping, the aluminum component mapping, and the oxygen component mapping may be performed by performing an EDS (Energy Dispersive X-ray Spectroscopy) elemental analysis (using Phenom ProX, product of Phenom-World Holding B.V). Next, a region in which all of a sulfur component, an aluminum component, and an oxygen component are detected is determined as the support layer, and the length of a perpendicular line drawn from the surface of the support layer toward the substrate in the support layer is measured. Similarly, the length of a perpendicular line in the support layer is measured at 10 randomly-selected points, and the average of these measured values is taken as the thickness of the support layer.

As described above, the support layer is a layer containing alumite sulfate. The hardness of such a layer can be more improved as compared with a layer containing aluminum oxide produced by a treatment other than the alumite sulfate treatment. Thus, the hardness of the conveyer having the support layer can be thereby improved. Specifically, it is preferable that the Vickers hardness of the conveyer be in the range of from 400 to 500 Hv. When the Vickers hardness of the conveyer is from 400 to 500 Hv, wear of the surface of the conveyer having recessed and non-recessed shapes is prevented, the recessed and non-recessed shapes exert a spacer effect that prevents detachment of the fluororesin adhering to the recessed portions upon contact of the conveyer with the contacted member, and the runout tolerance can be reduced for a more extended period of time. As a result, the vibration caused in the drying device can be more suppressed. The Vickers hardness can be measured based on a test method according to the Japanese Industrial Standards (JIS) Z2244.

Fluororesin

The fluororesin can improve lubricity between the conveyer and the contacted member. Since the fluororesin is adhering to the recessed portions of the support layer as described above, the runout tolerance can be reduced for an extended period of time. As a result, the vibration caused in the drying device can be suppressed.

Specific examples of the fluororesin include, but are not limited to, tetrafluoroethylene-perfluoroalkyl vinyl ether copolymer (PFA, melting point: 300-310° C.), polytetrafluoroethylene (PTFE, melting point: 330° C.), tetrafluoroethylene-hexafluoropropylene copolymer (FEP, melting point: 250-280° C.), ethylene-tetrafluoroethylene copolymer (ETFE, melting point: 260-270° C.), polyvinylidene fluoride (PVDF, melting point: 160-180° C.), polychlorotrifluoroethylene (PCTFE, melting point: 210° C.), tetrafluoroethylene-hexafluoropropylene-perfluoroalkyl vinyl ether copolymer (EPE, melting point: 290-300° C.), and mixtures containing the above-described polymers. Among these, polytetrafluoroethylene (PTFE) is preferred.

A proportion of an area where the fluororesin is present to an area of the surface layer is preferably from 15.0% to 30.0%. When the proportion of the area where the fluororesin is present is 15.0% or more, the runout tolerance can be reduced for a more extended period of time. When the proportion of the area where the fluororesin is present is 30.0% or less, the fluororesin gets crushed through a long-term use of the conveyer and comes to express tackiness, suppressing an increase of the runout tolerance. The proportion of the area where the fluororesin is present can be determined, for example, as follows. First, a fluorine component mapping is performed on the surface layer of the conveyer. Specifically, the fluorine component mapping may be performed by performing an EDS (Energy Dispersive X-ray Spectroscopy) elemental analysis (using Phenom ProX, product of Phenom-World Holding B.V). Next, using a software program ProSuite, a proportion of an area of a region where a fluorine component is present is calculated from the acquired data. Similarly, at 5 randomly selected portions, a proportion of an area of a region where a fluorine component is present is calculated, and the average of these calculated values is employed as the proportion of the area of the region in which the fluororesin is present. Here, a region where a fluorine component is present refers to a region where the fluorine atom concentration is 1% or more. The measured area at the time of calculation is, for example, 100 μm×100 μm.

Substrate

The substrate is disposed on a side of the surface layer, which does not come into contact with the contacted member. Preferably, the support layer is produced by treating the substrate with alumite sulfate at the time of manufacturing the conveyer. Therefore, it is preferable that the material constituting the substrate contain aluminum. Further, it is preferable that the material constituting the substrate contain magnesium in addition to aluminum. When aluminum is treated with alumite sulfate, aluminum oxide grows in a columnar shape. When magnesium is contained, the growth direction of aluminum oxide is disturbed and a stress is generated in aluminum oxide, thereby forming many recessed and non-recessed portions on the surface of the resulting support layer. Further, it is preferable that the material constituting the substrate contain silicon in addition to aluminum. When silicon is contained, similar to the case where magnesium is contained, the growth direction of aluminum oxide is disturbed and a stress is generated in aluminum oxide, thereby forming many recessed and non-recessed portions on the surface of the resulting support layer. As described above, when the resulting support layer have many recessed and non-recessed portions on the surface of the resulting support layer, the recessed and non-recessed shapes exert a spacer effect that prevents detachment of the fluororesin adhering to the recessed portions upon contact of the conveyer with a contacted member, and the runout tolerance can be reduced for a more extended period of time. As a result, the vibration caused in the drying device can be more suppressed.

The shape of the substrate is not particularly limited. Preferably, the substrate is a long metal rod. More preferably, the substrate is a roller such as a column or cylinder having a circular cross-section. When the substrate has such a shape, the conveyer can be used as a conveyance roller. When the substrate is a roller, the diameter of a circular cross-section of the conveyer is preferably from 50 to 600 mm. When the diameter is 50 mm or more, the pressure per unit area generated between the conveyer and the contacted member is reduced, and the runout tolerance can be reduced for a more extended period of time. When the diameter is 600 mm or less, an excessive adhesion between the conveyer and the contacted member is reduced, and the runout tolerance can be reduced for a more extended period of time.

Other Members

The conveyer may further include other members, as needed, in addition to the surface layer and the substrate. Examples of other members include, but are not limited to, heating means. Here, the heating means refers to means for applying heat to the contacted member via the surface layer. In one example, the shortest length between a predetermined position of the heating means and the surface layer is shorter than the shortest length between the predetermined position of the heating means and the contacted member. Therefore, when the conveyer has a roller shape, the heating means is provided inside the roller-shaped substrate and applies heat to the contacted member via the substrate and the surface layer. The heating means is not particularly limited, and various known means can be used. Specific examples thereof include a heater and means for generating warm air.

However, it is preferable that the conveyer do not include any heating means. This is because the heating means is provided for the purpose of directly heating the surface layer, so that the temperature of the surface layer tends to rise excessively. When the conveyer does not include any heating means, the temperature of the surface layer of the conveyer is prevented from excessively rising and adjusted to, for example, 200° C. or less, 150° C. or less, or 100° C. or less.

Heater

The heater is a member configured to heat the contacted member. For example, the heater heats a liquid composition applied to the contacted member to dry. At the time the heater applies heat to the contacted member, the inner temperature of the drying device also rises, so that the surface layer of the conveyer is indirectly brought to a high temperature state (for example, 50° C. or higher). On the other hand, in the case of using the conveyer of the present embodiment having recessed portions to which the fluororesin is adhering, even when the surface temperature of the conveyer rises during use, the fluororesin is prevented from being scraped off toward the contacted member side with time during conveyance of the contacted member. As a result, the runout tolerance can be reduced for an extended period of time, and the vibration caused in the drying device can be suppressed. The heater is not particularly limited, and various known devices can be used. For example, a general heater and a member that generates warm air can be used.

In the present disclosure, the "heater" is clearly distinguished from the "heating means" described above. The heating means is means for applying heat to the contacted member via the surface layer and is provided as one member constituting the conveyer. By contrast, the heater is not a member that applies heat to the contacted member via the surface layer, and is a member incorporated in a drying device or a printing apparatus as a member independent from the conveyer.

Drying Device

The drying device of the present embodiment is a device including the conveyer and the heater, and configured to heat the contacted member to which a liquid composition or the like is applied to dry it. The drying device may be used in a printing apparatus in combination with a liquid composition applicator configured to apply a liquid composition to the contacted member.

Figure 2:
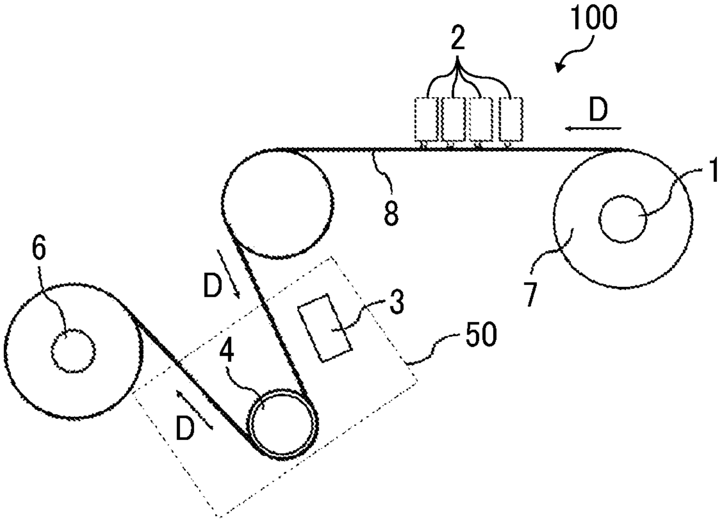
FIG. 2 is a schematic diagram illustrating a printing apparatus that uses continuous paper.

The drying device and the printing apparatus are described in detail below with reference to FIG. 2. FIG. 2 is a schematic diagram illustrating a printing apparatus that uses continuous paper. A printing apparatus 100 illustrated in FIG. 2 includes a contacted member feeder 1, a liquid composition applicator 2, a heater 3, a conveyer 4, and a contacted member collector 6. The printing apparatus 100 includes a drying device 50. The drying device 50 may be either integrated with or separated from other devices in the printing apparatus 100.

Contacted Member Feeder

The contacted member feeder 1 is rotationally driven to feed a contacted member 7 stored wound in a roll to a conveyance path 8 in the printing apparatus 100. The conveyance direction of the contacted member 7 in the conveyance path 8 is indicated by arrow D in the drawings.

The rotary drive of the contacted member feeder 1 is adjusted such that the contacted member 7 is conveyed at a high speed of 50 m/minute or higher.

The contacted member 7 is a sheet-like object to be conveyed that is continuous in the conveyance direction D in the printing apparatus 100. Specific examples thereof include a recording medium such as a continuous sheet. Examples of the continuous sheet include, but are not limited to, a rolled sheet and a folded sheet folded at predetermined intervals. The contacted member 7 is conveyed along the conveyance path 8 between the contacted member feeder 1 and the contacted member collector 6. The length of the contacted member 7 in the conveyance direction D is greater than at least the length of the conveyance path 8 provided for conveying the contacted member 7 between the contacted member feeder 1 and the contacted member collector 6. The printing apparatus 100 of the present embodiment uses the contacted member 7 that is continuous in the conveyance direction D in the printing apparatus 100 and conveys the contacted member 7 at a high speed. Therefore, a large tension is applied to the contacted member 7 between the contacted member feeder 1 and the contacted member collector 6.

Liquid Composition Applicator

The liquid composition applicator 2 is an inkjet discharge head having a plurality of nozzle arrays in each of which a plurality of nozzles is arranged. The liquid composition applicator 2 is disposed such that the direction of discharge of ink from the nozzles is directed to the conveyance path 8 for conveying the contacted member 7. Thus, the liquid composition applicator 2 sequentially applies to the contacted member 7 magenta (M), cyan (C), yellow (Y), and black (K) inks, each serving as a liquid composition. The colors of the discharged inks are not limited to these, and may be white, gray, silver, gold, green, blue, orange, violet, or the like.

In the present embodiment, the case in which the liquid composition is an ink is illustrated, but the liquid composition is not limited thereto. Examples thereof include, but are not limited to, an ink, a pretreatment liquid for coagulating a colorant contained in the ink, an aftertreatment liquid for protecting the surface of the applied ink, and an electric circuit forming liquid dispersing inorganic particles (e.g., metal particles). These may be appropriately mixed or applied superimposed each other.

In the present embodiment, the case in which the liquid composition is applied to the contacted member 7 by the inkjet discharge head is illustrated, but the liquid composition may be applied by other devices or methods. For example, various known methods such as spin coating, spray coating, gravure roll coating, reverse roll coating, and bar coating may be used.

Heater

The heater 3 heats the liquid composition applied to the contacted member 7 from the back side of the surface of the contacted member 7 having a region to which the liquid composition has been applied. The heater 3 is not particularly limited. Examples thereof include various known devices such as a hot air blower, and a dryer that brings the back surface of the contacted member 7 into contact with a flat heater or the like.

The heater 3 is disposed in the vicinity of the conveyer 4, and the surface temperature of the conveyer 4 is thereby raised high (for example, 50° C. or higher) during use. When the conveyer is used in an environment where the surface temperature is raised, the fluororesin easily gets scraped off toward the contacted member side as the contacted member is conveyed, and the runout tolerance of the conveyer becomes apparent with time. Therefore, it is preferable to use the above-described conveyer.

Conveyer

The conveyer 4 is a roller having a columnar or cylindrical shape that changes the conveyance direction D of the contacted member 7 while conveying the contacted member 7.

In the printing apparatus 100, as described above, the contacted member feeder 1 conveys the contacted member 7 at a speed of 50 m/minute or higher. In such a high-speed conveyance, as illustrated in FIG. 2, when the conveyance direction of the contacted member 7 is changed by the conveyer 4, a large pressure is applied between the conveyer 4 and the contacted member 7. Thus, the fluororesin easily gets scraped off toward the contacted member side as the contacted member is conveyed, and the runout tolerance of the conveyer becomes apparent with time. Therefore, it is preferable to use the above-described conveyer.

As described above, since the printing apparatus 100 conveys the contacted member 7 that is continuous in the conveyance direction D in the printing apparatus 100, a large tension is applied to the contacted member 7 between the contacted member feeder 1 and the contacted member collector 6. In such a case, as illustrated in FIG. 2, when the conveyance direction of the contacted member 7 that is applied with a large tension is changed by the conveyer 4, a large pressure is applied between the conveyer 4 and the contacted member 7. Thus, the fluororesin easily gets scraped off toward the contacted member side as the contacted member is conveyed, and the runout tolerance of the conveyer becomes apparent with time. Therefore, it is preferable to use the above-described conveyer.

When the conveyer 4 is a conveyance roller, as illustrated in FIG. 2, the conveyance direction of the contacted member 7 is changed as the contacted member 7 winds around the conveyance roller. At this time, a winding ratio of the contacted member 7 with respect to the conveyance roller is preferably 10% or more, more preferably 15% or more, and much more preferably 20% or more. When the winding ratio is 10% or more, the pressure per unit area generated between the conveyance roller and the contacted member 7 is reduced, the fluororesin is prevented from getting scraped off toward the contacted member side with time, and the runout tolerance of the conveyer is reduced. In addition, the winding ratio of the contacted member 7 with respect to the conveyance roller is preferably 90% or less, more preferably 70% or less, and much more preferably 50% or less. When the winding ratio is 50% or less, the contacted member 7 can be suitably conveyed.

Figure 3:
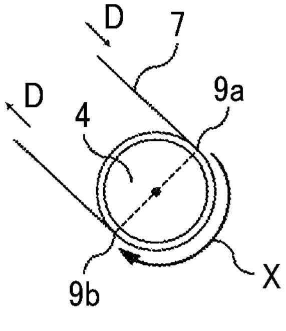
FIG. 3 is a schematic diagram illustrating a situation in which the contacted member is in contact with the conveyer.

The "winding ratio" in the present embodiment is described in detail below with reference to FIG. 3. FIG. 3 is a schematic diagram illustrating a situation in which the contacted member is in contact with the conveyer. When the contacted member 7 is in contact with the roller-shaped conveyer 4 as being wound around the conveyer 4, as illustrated in FIG. 3, the "winding ratio" is defined as the ratio of a circumferential length X of the conveyer 4 between end portions 9*a* and 9*b* to the total circumferential length of the conveyer 4. Here, the circumferential length X is defined on a side where the contacted member 7 and the conveyer 4 is contacting, and the end portions 9*a* and 9*b* are portions at each of which the contacted member 7 separates from the conveyer 4.

Contacted Member Collector

The contacted member collector 6 rotary-drives to wind up in a roll the contacted member 7 on which an image has been formed with the liquid composition having been applied.

Printing Method

A printing method of the present embodiment includes a liquid composition applying step for applying a liquid composition to a contacted member, and a drying step for drying the contacted member using the above-described drying device.

Liquid Composition Applying Step

The liquid composition applying step is a step for applying a liquid composition (e.g., ink) to the contacted member 7 fed by the contacted member feeder 1. As a result, a region to which the liquid composition has been applied is formed on the contacted member 7.

Drying Step

The drying step is a step for heating the applied liquid composition to dry it using the drying device 50, after the liquid composition applying step. Preferably, the drying is performed to such an extent that the contacted member 7 becomes not sticky.

Liquid Composition

The liquid composition to be applied to the contacted member is not particularly limited. Examples thereof include, but are not limited to, an ink, a pretreatment liquid for coagulating a colorant contained in the ink, an aftertreatment liquid for protecting the surface of the applied ink, and an electric circuit forming liquid dispersing inorganic particles (e.g., metal particles). These can be appropriately used in a known composition. Hereinafter, a case in which an ink is used as the liquid composition is described as an example.

Ink

Compositional materials of the ink, such as organic solvents, water, colorants, resins, waxes, and additives, are described in detail below.

Organic Solvent

The organic solvent is not particularly limited and water-soluble organic solvents can be used. Examples thereof include, but are not limited to, polyols, ethers such as polyol alkyl ethers and polyol aryl ethers, nitrogen-containing heterocyclic compounds, amides, amines, and sulfur-containing compounds.

Specific examples of the polyols include, but are not limited to, ethylene glycol, diethylene glycol, 1,2-propanediol, 1,3-propanediol, 1,2-butanediol, 1,3-butanediol, 1,4-butanediol, 2,3-butanediol, 3-methyl-1,3-butanediol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butanetriol, 1,2,3-butanetriol, 2,2,4-trimethyl-1,3-pentanediol, and 3-methyl-1,3,5-pentanetriol.

Specific examples of the polyol alkyl ethers include, but are not limited to, ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether.

Specific examples of the polyol aryl ethers include, but are not limited to, ethylene glycol monophenyl ether and ethylene glycol monobenzyl ether.

Specific examples of the nitrogen-containing heterocyclic compounds include, but are not limited to, 2-pyrrolidone, N-methyl-2-pyrrolidone, N-hydroxyethyl-2-pyrrolidone, 1,3-dimethyl-2-imidazolidinone, ε-caprolactam, and γ-butyrolactone.

Specific examples of the amides include, but are not limited to, formamide, N-methylformamide, N,N-dimethylformamide, 3-methoxy-N,N-dimethylpropionamide, and 3-butoxy-N,N-dimethylpropionamide.

Specific examples of the amines include, but are not limited to, monoethanolamine, diethanolamine, and triethylamine.

Specific examples of the sulfur-containing compounds include, but are not limited to, dimethylsulfoxide, sulfolane, and thiodiethanol.

Specific examples of other organic solvents include, but are not limited to, propylene carbonate and ethylene carbonate.

In particular, organic solvents having a boiling point of 250° C. or less are preferred, since they not only function as a wetting agent but also provide good drying property.

Preferred examples of the organic solvent further include polyol compounds having 8 or more carbon atoms and glycol ether compounds. Specific examples of the polyol compounds having 8 or more carbon atoms include, but are not limited to, 2-ethyl-1,3-hexanediol and 2,2,4-trimethyl-1,3-pentanediol.

Specific examples of the glycol ether compounds include, but are not limited to, polyol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; and polyol aryl ethers such as ethylene glycol monophenyl ether and ethylene glycol monobenzyl ether.

In particular, when a resin is used as an ink composition, N,N-dimethyl-β-butoxypropionamide, N,N-dimethyl-β-ethoxypropionamide, 3-ethyl-3-hydroxymethyloxetane, and propylene glycol monomethyl ether are preferred. Each of these can be used alone or in combination with others. Among these, amide solvents such as 3-butoxy-N,N-dimethylpropionamide and 3-methoxy-N,N-dimethylpropionamide are particularly preferred. In this case, formation of the resin film is promoted and high abrasion resistance is expressed.

Preferably, the organic solvent has a boiling point of from 180° C. to 250° C. When the boiling point is 180° C. or higher, the evaporation rate during drying can be appropriately adjusted, leveling is sufficiently performed, surface irregularities are reduced, and glossiness can be improved. By contrast, when the boiling point is higher than 250° C., drying property is low, which may require drying for a long period of time. With the recent speeding up of printing technology, the time required for drying the ink has become rate-determining and the drying time should be shortened. Drying for a long period of time is not preferred.

The proportion of the organic solvent in the ink is not particularly limited and can be suitably selected to suit to a particular application, but is preferably from 10% to 60% by mass, more preferably from 20% to 60% by mass, for drying property and discharge reliability of the ink.

The proportion of the amide solvent in the ink is preferably from 0.05% to 10% by mass, more preferably from 0.1% to 5% by mass.

Water

The proportion of water in the ink is not particularly limited and can be suitably selected to suit to a particular application, but is preferably from 10% to 90% by mass, more preferably from 20% to 60% by mass, for drying property and discharge reliability of the ink.

Colorant

The colorant is not particularly limited, and pigments and dyes can be used as the colorant.

Usable pigments include both inorganic pigments and organic pigments. Each of these may be used alone or two or more of these may be used in combination. Mixed crystals can also be used as the pigments.

Usable pigments include black pigments, yellow pigments, magenta pigments, cyan pigments, white pigments, green pigments, orange pigments, glossy color pigments (e.g., gold pigments and silver pigments), and metallic pigments.

Specific examples of inorganic pigments include, but are not limited to, titanium oxide, iron oxide, calcium carbonate, barium sulfate, aluminum hydroxide, Barium Yellow, Cadmium Red, Chrome Yellow, and carbon black produced by a known method such as a contact method, a furnace method, and a thermal method.

Specific examples of the organic pigments include, but are not limited to, azo pigments, polycyclic pigments (e.g., phthalocyanine pigments, perylene pigments, perinone pigments, anthraquinone pigments, quinacridone pigments, dioxazine pigments, indigo pigments, thioindigo pigments, isoindolinone pigments, quinophthalone pigments), dye chelates (e.g., basic dye chelate, acid dye chelate), nitro pigments, nitroso pigments, and aniline black.

Among these pigments, those having good affinity for solvents are preferred. In addition, hollow resin particles and hollow inorganic particles can also be used.

Specific examples of pigments used for black-and-white printing include, but are not limited to: carbon blacks (i.e., C.I. Pigment Black 7) such as furnace black, lamp black, acetylene black, and channel black; metals such as copper, iron (i.e., C.I. Pigment Black 11), and titanium oxide; and organic pigments such as aniline black (i.e., C.I. Pigment Black 1).

Specific examples of pigments used for color printing include, but are not limited to: C.I. Pigment Yellow 1, 3, 12, 13, 14, 17, 24, 34, 35, 37, 42 (Yellow Iron Oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51; C.I. Pigment Red 1, 2, 3, 5, 17, 22, 23, 31, 38, 48:2, 48:2 (Permanent Red 2B(Ca)), 48:3, 48:4, 49:1, 52:2, 53:1, 57:1 (Brilliant Carmine 6B), 60:1, 63:1, 63:2, 64:1, 81, 83, 88, 101 (Red Iron Oxide), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, and 264; C.I. Pigment Violet 1 (Rhodamine Lake), 3, 5:1, 16, 19, 23, and 38; C.I. Pigment Blue 1, 2, 15 (Phthalocyanine Blue), 15:1, 15:2, 15:3, 15:4 (Phthalocyanine Blue), 16, 17:1, 56, 60, and 63; and C.I. Pigment Green 1, 4, 7, 8, 10, 17, 18, and 36.

The dyes are not particularly limited, and acid dyes, direct dyes, reactive dyes, and basic dyes can be used. Each of these can be used alone or in combination with others.

Specific examples of the dyes include, but are not limited to, C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C. I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

The proportion of the colorant in the ink is preferably from 0.1% to 15% by mass, more preferably from 1% to 10% by mass, for improving image density, fixability, and discharge stability.

The pigment can be dispersed in the ink by any of the following methods: introducing a hydrophilic functional group to the pigment to make the pigment self-dispersible; covering the surface of the pigment with a resin; and dispersing the pigment by a dispersant.

In the method of introducing a hydrophilic functional group to the pigment to make the pigment self-dispersible, for example, a functional group such as sulfone group and carboxyl group may be introduced to the pigment (e.g., carbon) to make the pigment dispersible in water.

In the method of covering the surface of the pigment with a resin, for example, the pigment may be incorporated in a microcapsule to make the pigment self-dispersible in water. This pigment may be referred to as a resin-covered pigment. In this case, not all the pigment particles included in the ink should be covered with a resin. It is possible that a part of the pigment particles is not covered with any resin or partially covered with a resin.

In the method of dispersing the pigment by a dispersant, low-molecular dispersants and high-molecular dispersants, represented by known surfactants, may be used.

More specifically, any of anionic surfactants, cationic surfactants, ampholytic surfactants, and nonionic surfactants may be used as the dispersant depending on the property of the pigment. For example, a nonionic surfactant RT-100 (product of TAKEMOTO OIL & FAT Co., Ltd.) and sodium naphthalenesulfonate formalin condensate are preferably used as the dispersant. Each of the above dispersants may be used alone or in combination with others.

Pigment Dispersion

The ink can be obtained by mixing a pigment with other materials such as water and an organic solvent. The ink can also be obtained by, first, preparing a pigment dispersion by mixing a pigment with water, a dispersant, etc., and thereafter mixing the pigment dispersion with other materials such as water and an organic solvent.

The pigment dispersion can be obtained by mixing water, a pigment, a pigment dispersant, and other components, if any, to disperse the pigment, and adjusting the particle diameter of the pigment. Preferably, the dispersing is performed by a disperser.

The particle diameter of the pigment dispersed in the pigment dispersion is not particularly limited, but the number-based maximum frequency particle diameter is preferably in the range of from 20 to 500 nm, more preferably from 20 to 150 nm, for improving dispersion stability of the pigment and discharge stability and image quality (e.g., image density) of the ink. The particle diameter of the pigment can be measured using a particle size analyzer (NANOTRAC WAVE-UT151, product of MicrotracBEL Corp.).

The proportion of the pigment in the pigment dispersion is not particularly limited and can be suitably selected to suit to a particular application, but is preferably from 0.1% to 50% by mass, more preferably from 0.1% to 30% by mass, for improving discharge stability and enhancing image density.

Preferably, the pigment dispersion is subjected to filtration using a filter or a centrifugal separator to remove coarse particles, followed by degassing.

Resin

The type of the resin contained in the ink is not particularly limited and can be suitably selected to suit to a particular application. Specific examples thereof include, but are not limited to, urethane resins, polyester resins, acrylic resins, vinyl acetate resins, styrene resins, butadiene resins, styrene-butadiene resins, vinyl chloride resins, acrylic styrene resins, and acrylic silicone resins.

Resin particles made of these resins may also be used. The resin particles may be dispersed in water serving as a dispersion medium to prepare a resin emulsion. The ink can be obtained by mixing the resin emulsion with other materials such as a colorant and an organic solvent.

These resin particles are available either synthetically or commercially. The resin particles may include one type or two or more types of resin particles.

Among these, urethane resin particles are preferably used in combination with other resin particles because an image formed with an ink containing urethane resin particles has so large a tackiness that blocking resistance is deteriorated. On the other hand, the large tackiness of urethane resin particles makes it possible to firmly form an image with an improve fixability.

In addition, an image formed with an ink containing urethane resin particles having a glass transition temperature (Tg) of from −20° C. to 70° C. have a greater tackiness, and fixability is more improved.

Among the above resins, acrylic resin particles containing an acrylic resin are widely used because of their excellent discharge stability and low cost. However, because of poor rub resistance, acrylic resin particles are preferably used in combination with urethane resin particles having elasticity.

The volume average particle diameter of the resin particles is not particularly limited and can be suitably selected to suit to a particular application, but is preferably from 10 to 1,000 nm, more preferably from 10 to 200 nm, and particularly preferably from 10 to 100 nm, for good fixability and high image hardness.

The volume average particle diameter can be measured using a particle size analyzer (NANOTRAC WAVE-UT151, product of MicrotracBEL Corp.).

The proportion of the resin in the ink is not particularly limited and can be suitably selected to suit to a particular application, but is preferably from 1% to 30% by mass, more preferably from 5% to 20% by mass, for fixability and storage stability of the ink.

The particle size of solid contents in the ink is not particularly limited and can be suitably selected to suit to a particular application. The number-based maximum frequency particle diameter of solid contents in the ink is preferably in the range of from 20 to 1,000 nm, more preferably from 20 to 150 nm, for improving discharge stability and image quality (e.g., image density). The solid contents include the resin particles and pigment particles. The particle diameter can be measured using a particle size analyzer (NANOTRAC WAVE-UT151, product of MicrotracBEL Corp.).

Wax

When the ink contains a wax, rub resistance is improved. When the ink contains a wax in combination with the resin, glossiness is improved. Preferred examples of the wax include a polyethylene wax. Examples of commercially-available products of the polyethylene wax include, but are not limited to, AQUACER 531 (product of BYK Japan KK), POLYRON P502 (product of Chukyo Yushi Co., Ltd.), AQUAPETRO DP2502C (product of TOYO ADL CORPORATION), and AQUAPETRO DP2401 (product of TOYO ADL CORPORATION). Each of these can be used alone or in combination with others.

The proportion of the polyethylene wax in the ink is preferably from 0.05% to 2% by mass, more preferably from 0.05% to 0.5% by mass or less. When the proportion is from 0.05% to 2% by mass, rub resistance and glossiness are sufficiently improved. When the proportion is 0.45% by mass or less, storage stability and discharge stability of the ink are particularly good, and the ink is more suitable for use in an inkjet system.

Additives

The ink may further contain a surfactant, a defoamer, a preservative, a fungicide, a corrosion inhibitor, and/or a pH adjuster.

Contacted Member

The contacted member is not particularly limited. Examples thereof include, but are not limited to, recording media such as plain paper, gloss paper, special paper, and cloth. In particular, low-permeability recording medium (also referred to as "low-absorptivity recording media") are suitable.

The low-permeability recording media refer to recording media having a surface with a low level of moisture permeability, absorptivity, or adsorptivity, and include a material having a number of hollow spaces inside but not opened to the exterior. Examples of the low-permeability recording media include, but are not limited to, coated papers used in commercial printing, and recording media such as paperboard in which waste paper pulp is blended into the intermediate layer and the back layer and a coating is provided on the surface.

The low-permeability recording media have a stronger grip force than recording media such as plain paper. Thus, the fluororesin easily gets scraped off toward the contacted member side as the contacted member is conveyed, and the runout tolerance of the conveyer becomes apparent with time. Therefore, it is preferable to use the above-described conveyer.

Low-Permeability Recording Media

Examples of the low-permeability recording media include, but are not limited to, a recording medium such as a coated paper having a support substrate, a surface layer provided on at least one surface of the support substrate, and optionally other layers as necessary.

In a recording medium having a support substrate and a surface layer, the transfer amount of pure water to the recording medium within a contact time of 100 ms, measured by a dynamic scanning absorptometer, is preferably from 2 to 35 $mL/m^2$, more preferably from 2 to 10 $mL/m^2$.

When the transfer amount of pure water within a contact time of 100 ms is too small, beading (i.e., a phenomenon in which adjacent dots attract each other to make the image surface rough) is likely to occur. When the transfer amount is too large, the ink dot diameter in the image may become too smaller than a desired diameter.

In addition, the transfer amount of pure water to the recording medium within a contact time of 400 ms, measured by a dynamic scanning absorptometer, is preferably from 3 to 40 $mL/m^2$, more preferably from 3 to 10 $mL/m^2$.

When the transfer amount of pure water within a contact time of 400 ms is too small, drying property is insufficient. When the transfer amount is too large, it is likely that the dried image has low glossiness. The transfer amount of pure water within a contact time of 100 ms or 400 ms is measured at the surface of the recording medium which has a surface layer thereon.

The dynamic scanning absorptometer ("DSA") is an instrument capable of accurately measuring the amount of liquid absorption within an extremely short time period, as disclosed in a paper entitled "Development and application of dynamic scanning absorptometer—Automation and improvement of Bristow measurement-", Shigenori Kuga, et al., Japan Tappi Journal, Volume 48, 1994, No. 5, pp. 88-92. The dynamic scanning absorptometer provides an automated measurement that involves directly measuring the rate of liquid absorption by tracking the motion of meniscus in a capillary, spirally scanning a liquid supply head on a disc-shaped specimen, and automatically varying the scanning speed according to the preset pattern to perform the measurement required number of times using a single specimen.

The liquid supply head for supplying a liquid to a paper specimen is connected to the capillary via a TEFLON (registered trademark) tube. The position of meniscus is automatically tracked by an optical sensor. In particular, the transfer amount of pure water or ink may be measured using a dynamic scanning absorptometer K350 series D type (product of KYOWA SEIKO CO., LTD.).

The transfer amount within a contact time period of 100 ms or 400 ms is determined by interpolating the transfer amounts measured within contact time periods near 100 ms or 400 ms.

Support Substrate

The support substrate is not particularly limited and can be suitably selected to suit to a particular application. Examples thereof include, but are not limited to, sheet-like materials such as wood-fiber-based paper and wood-fiber-and-synthetic-fiber-based non-woven fabric. The thickness of the support substrate is not particularly limited and can be suitably selected to suit to a particular application, but is preferably from 50 to 300 μm.

The basis weight of the support substrate is preferably from 45 to 290 $g/m^2$.

Surface Layer

The surface layer contains a pigment and a binder, and optionally contains a surfactant and other components, as necessary.

Examples of the pigment include inorganic pigments and combinations of inorganic and organic pigments. Specific examples of the inorganic pigments include, but are not limited to, kaolin, talc, ground calcium carbonate, precipitated calcium carbonate, calcium sulfite, amorphous silica, titanium white, magnesium carbonate, titanium dioxide, aluminum hydroxide, calcium hydroxide, magnesium hydroxide, zinc hydroxide, and chlorite.

Preferably, the amount of the inorganic pigment added to 100 parts by mass of the binder is 50 parts by mass or more.

Specific examples of the organic pigments include, but are not limited to, water-soluble dispersions of styrene-acrylic copolymer particles, styrene-butadiene copolymer particles, polystyrene particles, and polyethylene particles. Preferably, the amount of the organic pigment added to 100 parts by mass of all the pigments in the surface layer is from 2 to 20 parts by mass.

Preferably, the binder comprises a water-based resin. As the water-based resin, at least one of a water-soluble resin and a water-dispersible resin is preferably used. The water-soluble resin is not particularly limited and can be suitably selected to suit to a particular application.

Examples thereof include, but are not limited to, polyvinyl alcohol, cation-modified polyvinyl alcohol, acetal-modified polyvinyl alcohol, polyester, polyurethane, and polyester-polyurethane copolymer.

The surfactant contained in the surface layer as needed is not particularly limited and can be suitably selected to suit to a particular application. Examples thereof include anionic surfactants, cationic surfactants, ampholytic surfactants, and nonionic surfactants.

A method for forming the surface layer is not particularly limited and can be suitably selected to suit to a particular application. Examples thereof include, but are not limited to, a method of impregnating or coating the support substrate with a surface layer constituting liquid. The adhered amount of the surface layer constituting liquid is not particularly limited and can be suitably selected to suit to a particular application, but is preferably from 0.5 to 20 $g/m^2$, more preferably from 1 to 15 $g/m^2$, on solid basis.

EXAMPLES

Further understanding of the present disclosure can be obtained by reference to certain specific examples provided herein below for the purpose of illustration only and are not intended to be limiting.

Preparation Example of Black Pigment Dispersion

First, 20 g of a carbon black (NIPEX 160, product of Degussa AG, having a BET specific surface area of 150 $m^2/g$, an average primary particle diameter of 20 nm, a pH of 4.0, and a DBP oil absorption of 620 g/100 g), 20 mmol of a compound represented by the following structural formula (1), and 200 mL of ion-exchange high-purity water were mixed by a Silverson mixer at a revolution of 6,000 rpm at room temperature.

In a case in which the pH of the resulting slurry was higher than 4, 20 mmol of nitric acid was added thereto. Thirty minutes later, 20 mmol of sodium nitrite dissolved in a small amount of ion-exchange high-purity water was gently added to the above mixture. The mixture was further heated to 60° C. while being stirred, then subjected to a reaction for 1 hour. As a result, a modified pigment in which the compound represented by the following structural formula (1) was adducted to carbon black was produced.

Next, the pH was adjusted to 10 by adding an NaOH aqueous solution, thus obtaining a modified pigment dispersion 30 minutes later. The modified pigment dispersion, containing the pigment bonded to at least one geminal bisphosphonic acid group or sodium geminal bisphosphonate, was subjected to ultrafiltration using ion-exchange high-purity water and a dialysis membrane and thereafter to ultrasonic dispersion. As a result, a self-dispersing black pigment dispersion having a solid pigment content concentration of 16% by mass was obtained. Here, the self-dispersing black pigment had bisphosphonate group as a hydrophilic functional group.

[Chem. 1]

Structural Formula (1)

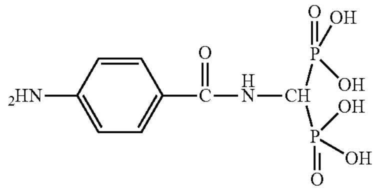

Preparation Example of Liquid Composition (Ink)

A liquid composition (ink) was prepared by mixing 50.00% by mass of the black pigment dispersion (having a solid pigment content concentration of 16%), 2.22% by mass of a polyethylene wax AQUACER 531 (containing 45% by mass of non-volatile contents, product of BYK Japan KK), 30.00% by mass of 3-ethyl-3-hydroxymethyl-oxetane, 10.0% by mass of propylene glycol monopropyl ether, 2.00% by mass of a silicone-based surfactant (TEGO Wet 270, product of Tomoe Engineering Co., Ltd.), and ion-exchange water in a balanced amount, then stirring the mixture for 1 hour, and filtering the mixture with a membrane filter having an average pore diameter of 1.2 μm.

Manufacturing Example of Printing Apparatus

Example 1

An aluminum hollow roller substrate (A5052, product of MISUMI Group Inc.) having a diameter of 80 mm was subjected to a surface treatment (alumite sulfate treatment) of anodizing aluminum in a sulfuric acid aqueous solution. More specifically, an electrode was attached to an end of the hollow roller substrate, and the hollow roller substrate was then submerged in a 15% by weight sulfuric acid aqueous solution adjusted to 0° C. to be subjected to an electrolytic treatment at a current density of 1.0 $A/dm^2$ for 0.5 hours using a metal rod as an anode. Thus, an alumite sulfate film (i.e., a layer containing aluminum oxide and from which a sulfur component was detectable) was deposited to form a support layer having a thickness of 14 μm. After the surface was thoroughly washed with pure water, the substrate was immersed in a PTFE dispersion (FLUON, product of AGC Chemicals) having been diluted to have a solid content concentration of 10% or less and then subjected to an air-drying process once. After the air-drying process, a polishing process was performed once in which the hollow roller was made to rotate at a speed of 10 rpm and a fluororesin fiber (TOMY FILEC, product of TOMOEGAWA CO., LTD.) was pressed against the rotating hollow roller to polish the hollow roller by wiping. Thus, a conveyer was prepared. Next, the above-prepared conveyer was mounted on an inkjet printing system (RICOH Pro VC60000, product of Ricoh Co., Ltd.) equipped with a heater. Thus, a printing apparatus of Example 1 containing a drying device was prepared.

Examples 2 to 8

The procedures in Example 1 were repeated except that the type of substrate, the time for electrolytic treatment, method of adhering resin, the number of times of adhering resin, and the number of times of polishing hollow roller were changed according to the descriptions in Tables 1-1 and 1-2. In Tables 1-1 and 1-2, "sulfuric acid" described as one type of electrolytic solution used for the electrolytic treatment indicates "sulfuric acid aqueous solution". In Tables 1-1 and 1-2, "spraying" described as one method of adhering resin in Examples 5 to 8 refers to a method of forming a coating film by spraying with a two-fluid nozzle a PTFE dispersion (FLUON, product of AGC Chemicals) having been diluted to have a solid content concentration of 10% or less onto a hollow roller rotating at a speed of 10 rpm.

Comparative Example 1

The procedures in Example 1 were repeated except that the type of substrate, the time for electrolytic treatment, method of adhering resin, the number of times of adhering resin, and the number of times of polishing hollow roller were changed according to the descriptions in Table 2 and that the type of electrolytic solution used for the electrolytic treatment was changed from sulfuric acid aqueous solution to oxalic acid aqueous solution. In Table 2, "oxalic acid" described as one type of electrolytic solution used for the electrolytic treatment indicates "oxalic acid aqueous solution".

Comparative Example 2

In Comparative Example 2, a printing apparatus was prepared in the same manner as in Example 1 except that the conveyer was replaced with an aluminum hollow roller substrate (A5052, product of MISUMI Group Inc.) having a diameter of 80 mm without any treatment.

Comparative Example 3

In Comparative Example 3, a printing apparatus was prepared in the same manner as in Example 1 except that the conveyer was replaced with an aluminum hollow roller substrate (A5052, product of MISUMI Group Inc.) having a diameter of 80 mm covered with a PFA tube (product of GUNZE LIMITED) having a thickness of 30 μm that had been shrunk by a heating treatment at 200° C.

Further, with respect to the printing apparatuses prepared in Examples 1 to 8 and Comparative Examples 1 to 3, components detected from the support layer of the conveyer, the depth of recessed portions of the support layer, the ratio of the area where the fluororesin is present with respect to the area of the surface layer, the presence or absence of non-adhesion region (region where the fluororesin is not adhering, in the recessed portions) having an area of from 0.01 to 0.03 $\mu m^2$, the thickness of the support layer, and the Vickers hardness of the conveyer are shown in Tables 1 and 2 below.

As a result of comparing, on the surface layer of the conveyer in the printing apparatuses prepared in Examples 1 to 8, an area where the fluororesin is present in a unit area of the recessed portions and an area where the fluororesin is present in a unit area of the non-recessed portions, the area where the fluororesin is present in a unit area of the recessed portions was much larger.

Vibration Level caused in Printing Apparatus during Conveyance of Contacted Member As described above, the printing apparatuses of Examples 1 to 8 and Comparative Examples 1 to 3 each containing a drying device were prepared by mounting respective conveyers thereon, and made to print images with a liquid composition (ink) on a recording medium serving as the contacted member. At this time, the winding ratio of the contacted member with respect to the conveyer was in the range of from 20% to 50%. As the recording medium, a rolled sheet LUMI ART GLOSS 130 gsm (product of Stora Enso, having a sheet width of 520.7 mm, low-permeability recording medium) was used. The length of the rolled sheet in the conveyance direction was greater than the length of the conveyance path of the printing apparatus.

First, the rolled sheet was set in the printing apparatus and conveyed at a speed of 50 m/minute for 12 km in the longitudinal length of the rolled sheet. Next, the rolled sheet was conveyed at a speed of 200 m/minute, and a vibration level caused in the printing apparatus during the conveyance operation was measured based on a measurement method according to JIS C 1510 and evaluated according to the following evaluation criteria. The conveyance operation before the evaluation and that at the time of the evaluation were performed by adjusting the intake/exhaust amount in the printing apparatus so that the temperature of the surface layer of the conveyer was adjusted to 70° C. The temperature of the surface layer was determined by attaching a heat-resistant black tape to an end of the conveyer and measuring the temperature of the tape with a radiation thermometer.

Evaluation Criteria

A: Vibration level is 70 db or less.

B: Vibration level is more than 70 db and not more than 80 db.

C: Vibration level is more than 80 db and not more than 90 db.

D: Vibration level is more than 90 db.

TABLE 1

| | | Examples | | | |
|---|---|---|---|---|---|
| | | 1 | 2 | 3 | 4 |
| Type of Aluminum Substrate | | A5052 | A5052 | A5052 | A6061 |
| Electrolytic Treatment Process | Electrolytic Solution | Sulfuric Acid | Sulfuric Acid | Sulfuric Acid | Sulfuric Acid |
| | Electrolysis Time (h) | 0.5 | 1.0 | 1.0 | 1.0 |
| Resin Adhesion Process | Adhesion Method | Immersing | Immersing | Immersing | Immersing |
| | Number of Times of Adhesion (times) | 1 | 1 | 1 | 1 |
| Polishing Process | Number of Times of Polishing (times) | 1 | 2 | 1 | 1 |
| Components Detected from Support layer | | Al, O, S | Al, O, S | Al, O, S | Al, O, S, Si |
| Depth of Recessed Portions in Support Layer (μm) | | 0.4 | 1.1 | 1.4 | 1.2 |
| Area Ratio of Fluororesin to Surface Layer (%) | | 10 | 26 | 29 | 30 |
| Presence/Absence of Non-adhesion Region with area of 0.01-0.03 $\mu m^2$ | | Present | Present | Present | Present |
| Thickness of Support Layer (μm) | | 14 | 22 | 29 | 31 |
| Vickers Hardness of Heater ($kgf/mm^2$) | | 351 | 388 | 390 | 450 |
| Vibration Level during Conveyance | (db) | 85 | 78 | 72 | 66 |
| | Evaluation Results | C | B | B | A |

| | | Examples | | | |
|---|---|---|---|---|---|
| | | 5 | 6 | 7 | 8 |
| Type of Aluminum Substrate | | A6061 | A6061 | A6061 | A6061 |
| Electrolytic Treatment Process | Electrolytic Solution | Sulfuric Acid | Sulfuric Acid | Sulfuric Acid | Sulfuric Acid |
| | Electrolysis Time (h) | 1.0 | 1.0 | 2.0 | 2.0 |
| Resin Adhesion Process | Adhesion Method | Spraying | Spraying | Spraying | Spraying |
| | Number of Times of Adhesion (times) | 1 | 2 | 2 | 2 |
| Polishing Process | Number of Times of Polishing (times) | 1 | 1 | 1 | 2 |
| Components Detected from Support layer | | Al, O, S, Si | Al, O, S, Si | Al, O, S, Si | Al, O, S, Si |
| Depth of Recessed Portions in Support Layer (μm) | | 1.4 | 1.6 | 1.9 | 2.2 |
| Area Ratio of Fluororesin to Surface Layer (%) | | 26 | 61 | 58 | 44 |
| Presence/Absence of Non-adhesion Region with area of 0.01-0.03 $\mu m^2$ | | Absent | Absent | Absent | Absent |
| Thickness of Support Layer (μm) | | 28 | 31 | 48 | 46 |
| Vickers Hardness of Heater ($kgf/mm^2$) | | 458 | 448 | 480 | 474 |
| Vibration Level during Conveyance | (db) | 76 | 79 | 86 | 88 |
| | Evaluation Results | B | B | C | C |

TABLE 2

| | | Comparative Examples | | |
|---|---|---|---|---|
| | | 1 | 2 | 3 |
| Type of Aluminum Substrate | | A5052 | A5052 | A5052 |
| Electrolytic | Electrolytic Solution | Oxalic Acid | — | — |
| Treatment Process | Electrolysis Time (h) | 2.0 | — | — |
| Resin Adhesion | Adhesion Method | Immersing | — | — |
| Process | Number of Times of Adhesion (times) | 1 | — | — |
| Polishing Process | Number of Times of Polishing (times) | 1 | — | — |
| Components Detected from Support layer | | Al, O | — | — |
| Depth of Recessed Portions in Support Layer (μm) | | 0.1 | — | — |
| Area Ratio of Fluororesin to Surface Layer (%) | | 15 | — | — |
| Presence/Absence of Non-adhesion Region with area of 0.01-0.03 $\mu m^2$ | | Present | — | — |

TABLE 2-continued

| | | Comparative Examples | | |
|---|---|---|---|---|
| | | 1 | 2 | 3 |
| Thickness of Support Layer (μm) | | 30 | — | — |
| Vickers Hardness of Heater ($kgf/mm^2$) | | 401 | — | — |
| Vibration Level | (db) | 91 | 105 | 102 |
| during Conveyance | Evaluation Results | D | D | D |

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

This patent application is based on and claims priority to Japanese Patent Application No. 2020-091268, filed on May 26, 2020, in the Japan Patent Office, the entire disclosure of which is hereby incorporated by reference herein.

REFERENCE SIGNS LIST

1 Contacted member feeder
2 Liquid composition applicator
3 Heater
4 Conveyer
6 Contacted member collector
7 Contacted member
8 Conveyance path
**9*a*,9*b*** End portions where the contacted member separates from the conveyer
50 Drying device
100 Printing apparatus

The invention claimed is:

1. A drying device, comprising:
a conveyer configured to convey a contacted member by contact with the contacted member; and
a heater configured to heat the contacted member,
wherein the conveyer includes a surface layer that comes into contact with the contacted member, and the surface layer includes:
a support layer having a surface having multiple recessed portions; and
a fluororesin adhering to the recessed portions,
wherein a proportion of an area where the fluororesin is present to an area of the surface layer is from 15.0% to 30.0%, and
wherein the support layer contains alumite sulfate.

2. The drying device of claim 1, wherein the recessed portions have a depth of from 0.2 to 2.0 μm.

3. The drying device of claim 1,
wherein the recessed portions include:
multiple adhesion regions to which the fluororesin is adhering; and
multiple non-adhesion regions to which the fluororesin is not adhering,
wherein at least one of the multiple non-adhesion regions has an area of from 0.01 to 0.03 $\mu m^2$.

4. The drying device of claim 1, wherein the support layer has a thickness of from 25.0 to 35.0 μm.

5. The drying device of claim 1, wherein the conveyer has a Vickers hardness of from 400 to 500 Hv.

6. The drying device of claim 1, wherein the conveyer is a roller having a diameter of from 50 to 600 mm.

7. The drying device of claim 1, wherein:
the surface of the support layer further has non-recessed portions other than the recessed portions,
the fluororesin is further adhering to the non-recessed portions, and
an area where the fluororesin is present in a unit area of the recessed portions is larger than an area where the fluororesin is present in a unit area of the non-recessed portions.

8. The drying device of claim 1, wherein the surface layer is heatable to 50° C. or higher.

9. The drying device of claim 1, wherein the contacted member is a recording medium.

10. The drying device of claim 1,
wherein the conveyer does not include any heater for applying heat to the contacted member via the surface layer,
wherein the heater is configured to heat the contacted member to dry the contacted member.

11. The drying device of claim 1, wherein, for each recessed portion of the recessed portions, a width of the recessed portion is greater than a depth of the recessed portion.

12. The drying device of claim 1, wherein, for each recessed portion of the recessed portions, a width of the recessed portion is greater than a depth of the recessed portion,
wherein the recessed portions include:
multiple adhesion regions to which the fluororesin is adhering; and
multiple non-adhesion regions to which the fluororesin is not adhering, and
wherein at least one of the multiple non-adhesion regions has an area of from 0.01 to 0.03 $\mu m^2$.

13. A drying device, comprising:
a conveyer configured to convey a contacted member by contact with the contacted member; and
a heater configured to heat the contacted member,
wherein the conveyer includes a surface layer that comes into contact with the contacted member, and the surface layer includes:
a support layer having a surface having multiple recessed portions; and
a fluororesin adhering to the recessed portions,
wherein a proportion of an area where the fluororesin is present to an area of the surface layer is from 15.0% to 30.0%, and
wherein the support layer contains aluminum oxide, and a sulfur component is detectable from the support layer.

14. A printing apparatus, comprising:
a liquid composition applicator configured to apply a liquid composition to a contacted member; and
the drying device of claim 1.

15. The printing apparatus of claim 14, further comprising:

a contacted member feeder configured to feed the contacted member;

a contacted member collector configured to collect the contacted member; and a conveyance path through which the contacted member fed from the contacted member feeder is conveyed to the contacted member collector, wherein a length of the contacted member in a direction of conveyance of the contacted member is shorter than a length of the conveyance path.

16. The printing apparatus of claim 14, wherein the conveyer is configured to convey the contacted member at a conveyance speed of 50 m/minute or more.

17. A printing method, comprising:

applying a liquid composition to a contacted member; and drying the contacted member using the drying device of claim 1.

* * * * *